United States Patent
Onimatsu et al.

(10) Patent No.: US 10,894,396 B2
(45) Date of Patent: Jan. 19, 2021

(54) DEVICE AND METHOD FOR MANUFACTURING MULTIPLE LAYER RUBBER STRIP

(71) Applicant: SUMITOMO RUBBER INDUSTRIES, LTD., Hyogo (JP)

(72) Inventors: Hiroyuki Onimatsu, Hyogo (JP); Kaoru Kubota, Hyogo (JP); Kazuya Suzuki, Hyogo (JP); Makoto Igarashi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/133,885

(22) Filed: Sep. 18, 2018

(65) Prior Publication Data

US 2019/0111672 A1 Apr. 18, 2019

(30) Foreign Application Priority Data

Oct. 12, 2017 (JP) .................................. 2017-198479

(51) Int. Cl.
  *B32B 37/15* (2006.01)
  *B32B 38/00* (2006.01)
  (Continued)

(52) U.S. Cl.
  CPC ............ *B32B 37/153* (2013.01); *B29D 30/42* (2013.01); *B32B 38/0004* (2013.01);
  (Continued)

(58) Field of Classification Search
  CPC ............ B29C 48/0013; B29C 48/0014; B29C 48/0021; B32B 37/153; B32B 38/1808; B29D 30/42
  See application file for complete search history.

(56) References Cited

U.S. PATENT DOCUMENTS 2,345,518 A * 3/1944 Wendel .................. B29D 30/52
                                                        152/209.17
4,875,959 A * 10/1989 Kumagai ............... B29D 30/42
                                                        156/123
(Continued)

FOREIGN PATENT DOCUMENTS

| JP | 2005-008071 A | | 1/2005 |
| JP | 2008-023743 A | | 2/2008 |
| JP | 2011183698 A | * | 9/2011 |

OTHER PUBLICATIONS

Machine translation of Japanese Patent Publication No. JP-2011183698A, originally published Sep. 22, 2011 (Year: 2011).*

*Primary Examiner* — Alex B Efta
(74) *Attorney, Agent, or Firm* — Greenblum & Bernstein, P.L.C.

(57) ABSTRACT

A device for manufacturing a multiple layer rubber strip including a first rubber strip and a second rubber strip, the device includes a first rubber extruder for extruding the first rubber strip, a second rubber extruder for extruding the second rubber strip, a first conveyor for conveying the first rubber strip extruded from the first extruder to a downstream side in a convey direction, and a second conveyor for conveying the second rubber strip extruded from the second extruder to a downstream side in the convey direction. The second conveyor is located upwardly of the first conveyor and has a downstream conveyor end which positions above a conveying surface of the first conveyor such that the second rubber strip delivered from the downstream conveyor end meets and overlaps the first rubber strip on the first conveyor at a joining location to form the single multiple layer rubber strip.

16 Claims, 11 Drawing Sheets

(51) Int. Cl.
- *B29D 30/48* (2006.01)
- *B32B 41/00* (2006.01)
- *B29D 30/42* (2006.01)
- *B29D 30/24* (2006.01)

(52) U.S. Cl.
CPC ............ *B32B 41/00* (2013.01); *B29D 30/48* (2013.01); *B29D 2030/241* (2013.01); *B29D 2030/481* (2013.01); *B29D 2030/482* (2013.01); *B29D 2030/486* (2013.01)

(56) References Cited

U.S. PATENT DOCUMENTS

| | | | | |
|---|---|---|---|---|
| 5,156,781 | A * | 10/1992 | Bohm | B29C 48/397 264/40.1 |
| 5,725,702 | A * | 3/1998 | Nakamura | B60C 15/06 152/539 |
| 2004/0154734 | A1* | 8/2004 | Akada | B32B 27/00 156/244.11 |
| 2006/0146410 | A1* | 7/2006 | Krause | G09F 11/00 359/619 |
| 2008/0053595 | A1* | 3/2008 | Hrycyk | B29D 30/48 156/136 |
| 2010/0077894 | A1* | 4/2010 | Kaagman | B26D 1/045 83/171 |
| 2010/0181000 | A1* | 7/2010 | Takahashi | B29D 30/0681 152/532 |
| 2013/0220519 | A1* | 8/2013 | Sugimoto | B29D 30/3007 156/123 |
| 2018/0001536 | A1* | 1/2018 | Burg | B29C 48/30 |

* cited by examiner

A—A

DEVICE AND METHOD FOR MANUFACTURING MULTIPLE LAYER RUBBER STRIP

BACKGROUND ART

Field of the Disclosure

The present disclosure relates to device and method for manufacturing a multiple layer rubber strip, e.g., a bead apex rubber for tires, having a cross-section with at least two kinds of rubber regions.

Description of the Related Art

As illustrated in FIG. 11, a heavy-duty tire includes a bead apex rubber (a) made of a multiple layer rubber strip extrusion which includes a radially inner region (a1) made of a hard rubber and a radially outer region (a2) made of a soft rubber (see the following Patent document 1).

Conventionally, the multiple layer rubber strip for the bead apex rubber (a) as such was manufactured using a two-layer rubber extrusion device (see the following Patent document 2). The two-layer rubber extrusion device includes two rubber extruders and a single extruder head to which the two rubber extruders are connected together, wherein the extruder head includes a preform unit and a die plate. The preform unit includes a preform flow passage where two kinds of rubber flow extruded from the respective rubber extruders meet to be pre-formed at a predetermined distribution which corresponds to an area ratio of rubber regions (a1) to (a2) in a cross-section thereof. The die plate includes a molding port which molds and extrudes a preformed rubber into a predetermined cross-sectional shape strip.

The bead apex rubber (a), usually, has a unique cross-sectional shape, size and a rubber distribution ratio a1/a2 and the like based on the tire size and category thereof. In case that the cross-sectional shape, size and rubber distribution ratio a1/a2 and the like of a multiple layer rubber strip should be changed for the two-layer rubber extrusion device, replacing the preform unit and the die plate with appropriate preform unit and die plate is needed, resulting in increasing equipment cost as well as deteriorating productivity due to replacement work. In particular, the replacement work for preform unit needs lot of time due to its complicated structure, leading to be a main cause in the above problems.

PATENT DOCUMENT

[Patent document 1] Japanese Unexamined Patent Application Publication 2005-8071
[Patent document 2] Japanese Unexamined Patent Application Publication 2008-23743

SUMMARY OF THE DISCLOSURE

In view of the above problems in the conventional art, the present disclosure has an object to provide device and method for manufacturing a multiple layer rubber strip capable of reducing equipment cost as well as improving productivity.

According to one aspect of the disclosure, a device for manufacturing a multiple layer rubber strip including at least a first rubber strip and a second rubber strip, the device includes a first rubber extruder for extruding the first rubber strip, a second rubber extruder for extruding the second rubber strip, a first conveyor for conveying the first rubber strip extruded from the first extruder to a downstream side in a convey direction, wherein the first conveyor has a conveying surface on which the first rubber strip is carried, and a second conveyor for conveying the second rubber strip extruded from the second extruder to a downstream side in the convey direction, the second conveyor located upwardly of the first conveyor and having a downstream conveyor end in the convey direction. The downstream conveyor end of the second conveyor positions above the conveying surface of the first conveyor such that the second rubber strip delivered from the downstream conveyor end of the second conveyor meets and overlaps the first rubber strip on the first conveyor at a joining location to form the single multiple layer rubber strip.

In another aspect of the disclosure, the device may further include a pressing device to press the first rubber strip and the second rubber strip of the multiple layer rubber strip with each other, wherein the pressing device may be located on a downstream side in the convey direction of the joining location.

In another aspect of the disclosure, the device may further include a third conveyor located on a downstream side of the first conveyor in the conveying direction such that the multiple layer rubber strip on the first conveyor is transferred to the third conveyer, wherein the pressing device is located between the first conveyor and the third conveyor.

In another aspect of the disclosure, each of the first and second rubber extruders may include a gear pump on an extruding end side thereof.

In another aspect of the disclosure, the device may further include a first festoon accumulator located between the first rubber extruder and the first conveyor, and a second festoon accumulator located between the second rubber extruder and the second conveyor.

In another aspect of the disclosure, the device may further include a speed controller that varies an extruding speed of the first rubber extruder based on a conveying speed of the first conveyor and that varies an extruding speed of the second rubber extruder based on a conveying speed of the second conveyor.

In another aspect of the disclosure, the multiple layer rubber strip may be for a bead apex rubber to be disposed on a radially outer surface of a circular bead core of a tire.

In another aspect of the disclosure, the device may further include a cutter for cutting the multiple layer rubber strip to obtain bead apex rubber strips sequentially such that each of the bead apex rubber strips has a circumferentially extending first side thereof being longer than a circumferentially extending second side thereof, wherein the second side of each of the bead apex rubber strips is to be arranged on the radially outer surface of the bead core.

In another aspect of the disclosure, the cutter may cut the multiple layer rubber strip in such a manner as to cut an independent triangle or trapezoid shaped piece out of between adjacent bead apex rubber strips.

In another aspect of the disclosure, a method for manufacturing a multiple layer rubber strip includes using the device according to claim 1 to form a multiple layer rubber strip including at least a first rubber strip and a second rubber strip joined together.

DESCRIPTION OF THE PREFERRED EMBODIMENTS

Figure 1:
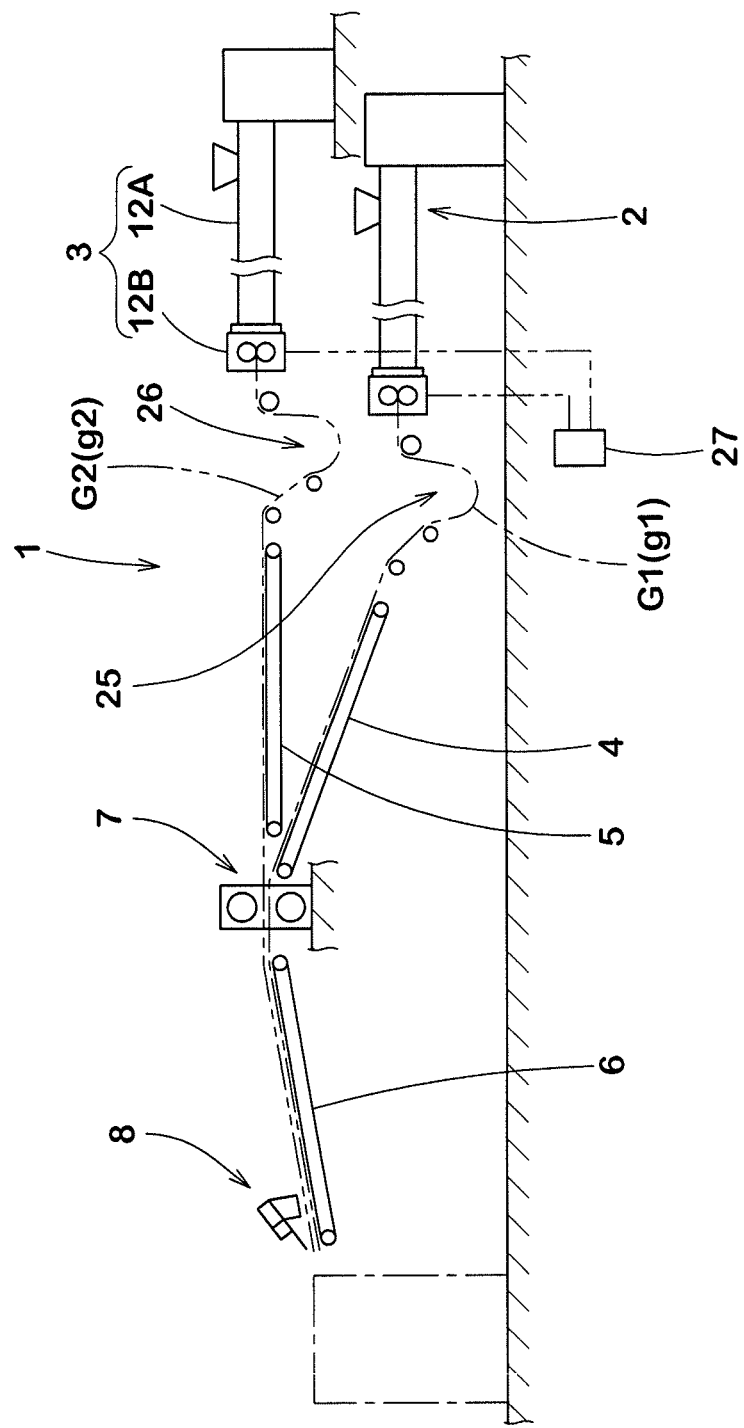
FIG. 1 is a side view of a device for manufacturing a multiple layer rubber strip in accordance with an embodiment of the present disclosure.

An embodiment of the present invention will be explained below with reference to the accompanying drawings. As illustrated in FIG. 1, in this embodiment, a device 1 for manufacturing a multiple-layer rubber strip (hereinafter, simply referred to as "device") includes a first rubber extruder 2, a second rubber extruder 3, a first conveyor 4, and a second conveyor 5. In this embodiment, the device 1 further includes a third conveyor 6, a pressing device 7, and a cutter 8.

Figure 8:
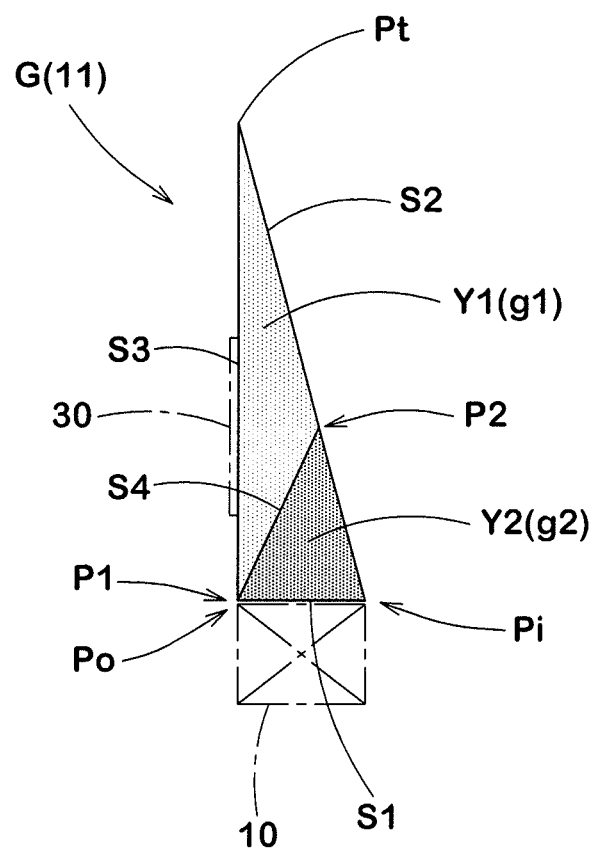
FIG. 8 is conceptual cross-sectional view of an embodiment of a multiple layer rubber strip.

Preferably, the device 1, as illustrated in FIG. 8, may manufacture a multiple layer rubber strip G which has a cross-section, perpendicular to a longitudinal direction, including a first rubber region Y1 made of a first rubber composition g1 and a second rubber region Y2 made of a second rubber composition g2. In this embodiment, the multiple layer rubber strip G is embodied as a strip for a bead apex rubber strip 11 which is to be wound around a circular bead core 10.

For example, the bead apex rubber strip 11 has a substantially triangular cross-sectional shape which includes a bottom surface S1 to be wound around an outer surface of the bead core 10, an inner surface S2 extending from an inner end Pi of the bottom surface S1 in the tire axial direction to an outer tip end Pt in the tire radial direction, and an outer surface S3 extending from an outer end Po of the bottom surface S1 in the tire axial direction to the outer tip end Pt. The bead apex rubber strip 11 includes the first rubber region Y1 located radially outwardly, the second rubber region Y2 located radially inwardly, and a boundary between these regions Y1 and Y2 which is formed by the respective common facing surfaces S4 extend from a point P1 on the bottom surface S1 to a point P2 on the inner surface S2. In this embodiment, the first rubber composition g1 has rubber hardness smaller than that of the second rubber composition g2.

As illustrated in FIG. 1, each of the first and second rubber extruders 2 and 3 is a single layer rubber extruder which includes a screw extruder main body 12A and a gear pump 12B connected to an extruding end of the screw extruder main body 12A, for example. The first rubber extruder 2 is configured to extrude a first rubber strip G1 in a cross-sectional shape similar to the first rubber region Y1. The second rubber extruder 3 is configured to extrude a second rubber strip G2 in a cross-sectional shape similar to the second rubber region Y2.

Note that as the extruder main body 12A as well as the gear pump 12B, various kinds of conventional devices may be used.

Figure 2:
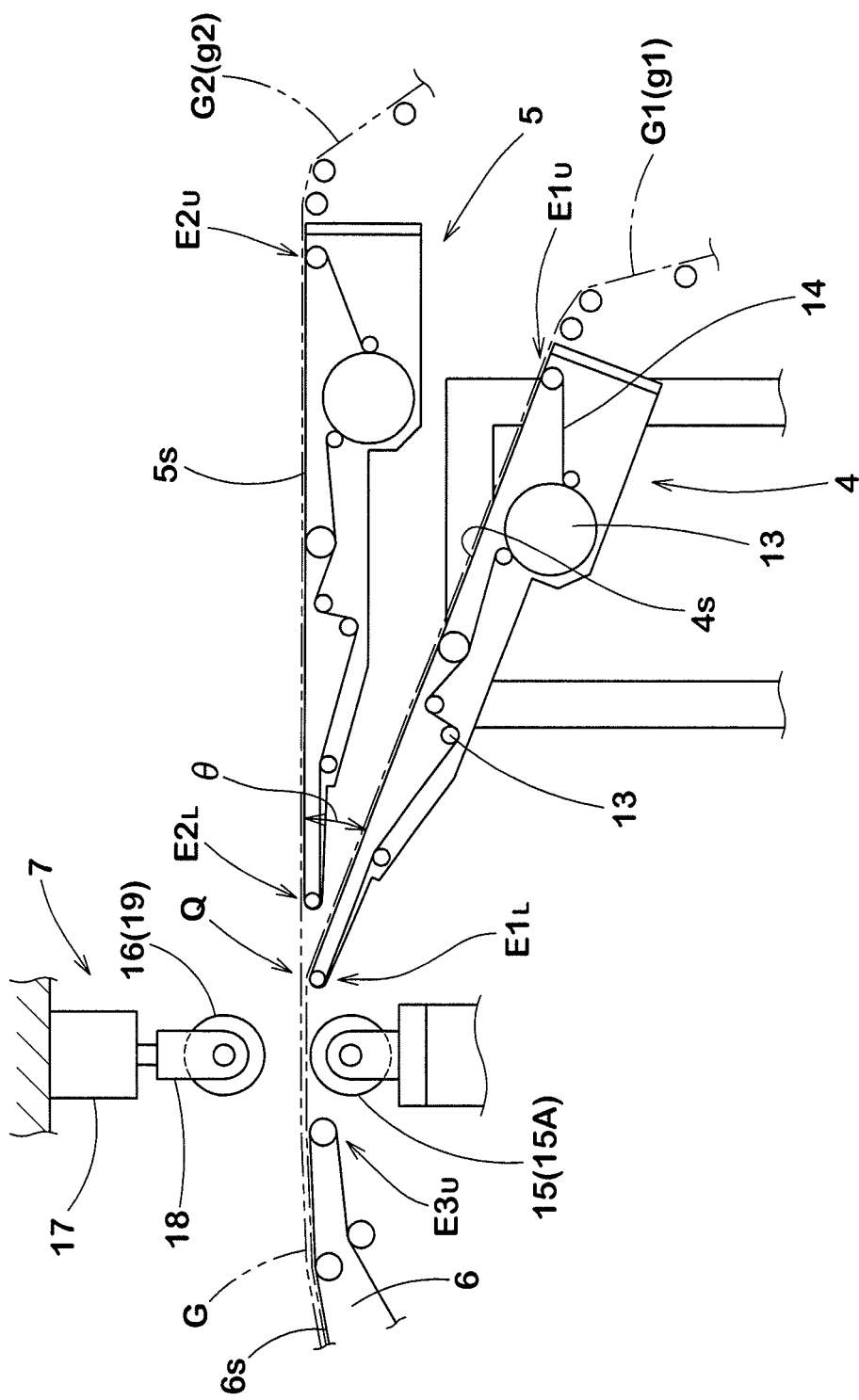
FIG. 2 is an enlarged view of a main portion of FIG. 1.

As illustrated in FIG. 2, each of the first conveyor 4, the second conveyor 5 and the third conveyor 6 includes a plurality of guide rollers 13 and a conveyor belt 14 which revolves circularly around the plurality of guide rollers 13.

The first conveyor 4 conveys the first rubber strip G1 extruded from the first extruder 2 to a downstream side in a convey direction, i.e., conveying from an upstream conveyor end $E1_U$ to its downstream conveyor end $E1_L$. The second conveyor 5 passes above the first conveyor 4. Further, the second conveyor 5 conveys the second rubber strip G2 extruded from the second extruder 3 to a downstream side in the convey direction, i.e., conveying from an upstream conveyor end $E2_U$ to its downstream conveyor end $E2_L$.

Figure 3:
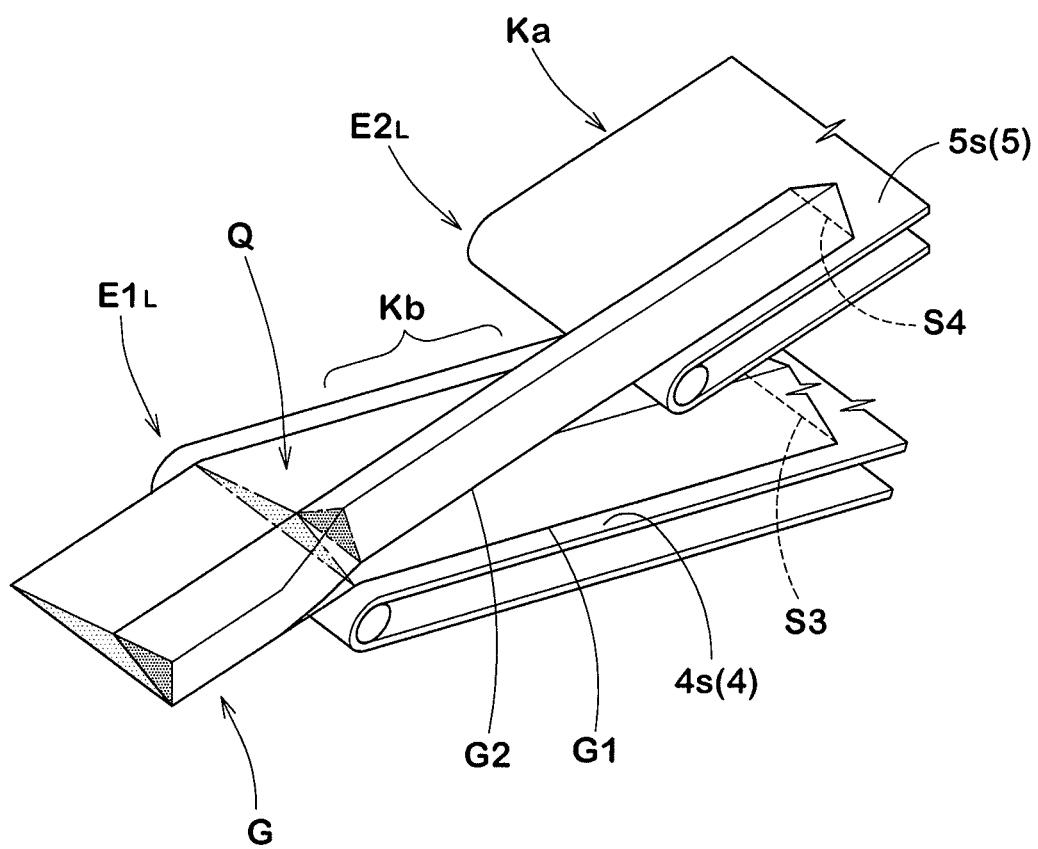
FIG. 3 is a perspective view of a first rubber strip and a second rubber strip around a joining location.
Figure 4A:
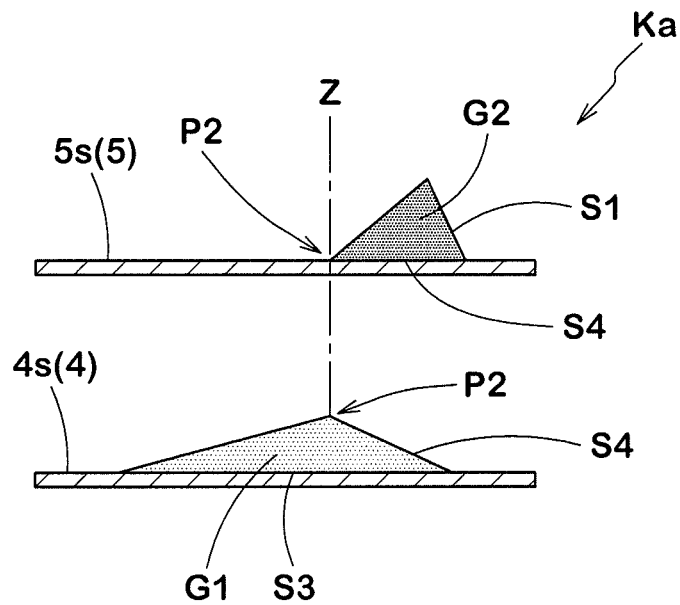
FIGS. 4A and 4B each are cross-sectional views of the first rubber strip and the second rubber strip for explaining before and after joining.

As illustrated in FIG. 3 and FIG. 4A, in this embodiment, the first conveyor 4 includes a conveying surface 4s for receiving the outer surface S3 of the first rubber strip G1. The second conveyor 5 includes a conveying surface 5s for receiving the surface S4 of the second rubber strip G2 corresponding to the boundary between the regions Y1 and Y2. In this embodiment, since these conveyors 4 and 5 receive the outer surface S3 which is the widest surface of the first rubber strip G1 and the surface S4 of the second rubber strip G2 which is the widest surface of the second rubber strip G2, the first rubber strip G1 as well as the second rubber strip G2 can be carried stably.

As illustrated in FIGS. 2 and 3, the downstream conveyor end $E2_L$ of the second conveyor 5 positions above the conveying surface 4s of the first conveyor 4. Thus, the second rubber strip G2 delivered from the downstream conveyor end $E2_L$ of the second conveyor 5 meets and overlaps the first rubber strip G1 on the first conveyor 4 at a joining location Q to form a single multiple layer rubber strip G. Therefore, at the downstream of the joining location Q, the multiple layer rubber strip G in which the first rubber strip G1 and the second rubber strip G2 are stacked up and down is obtained.

Figure 4B:
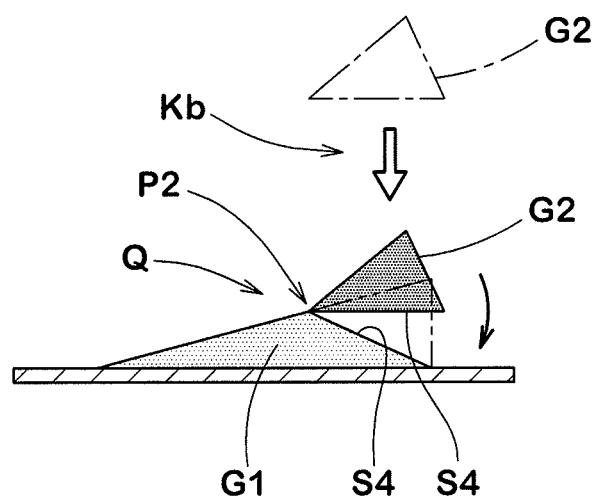

As illustrated in FIG. 4A, in a conveying process Ka on an upstream side of the downstream conveyor end $E2_L$, the first rubber strip G1 and the second rubber strip G2 are conveyed separately from each other up and down. As illustrated in FIG. 4B, in a transit process Kb until the second rubber strip G2 delivered from the downstream conveyor end $E2_L$ reaches the joining location Q, the second rubber strip G2 approaches the first rubber strip G1 while maintaining the orientation of the cross section. Then, at the joining location Q, when the point P2 of the second rubber strip G2 is in contact with the point P2 of the first rubber strip G1, the second rubber strip G2 is twisted so that the surface S4 of second rubber strip G2 faces to come into contact with the surface S4 of the first rubber strip G1. Thus, the multiple layer rubber strip G is obtained.

As illustrated in FIG. 4A, as this embodiment, the first rubber strip G1 and the second rubber strip G2 are preferably conveyed such that the point P2 of the second rubber strip G2 positions on the vertical line Z passing the point P2 of the first rubber strip G1. As illustrated in FIG. 2, an angle θ between the conveying surface 4s of the first conveyor 4 and the conveying surface 5s of the second conveyor 5 is preferably of from 20 to 30 degrees, for example. When the angle θ is less than 20 degrees, it may be necessary to design a long transit process Kb which is unstable. On the other hand, when the angle θ exceeds 30 degrees, a big impact upon joining may occur.

Figure 10:
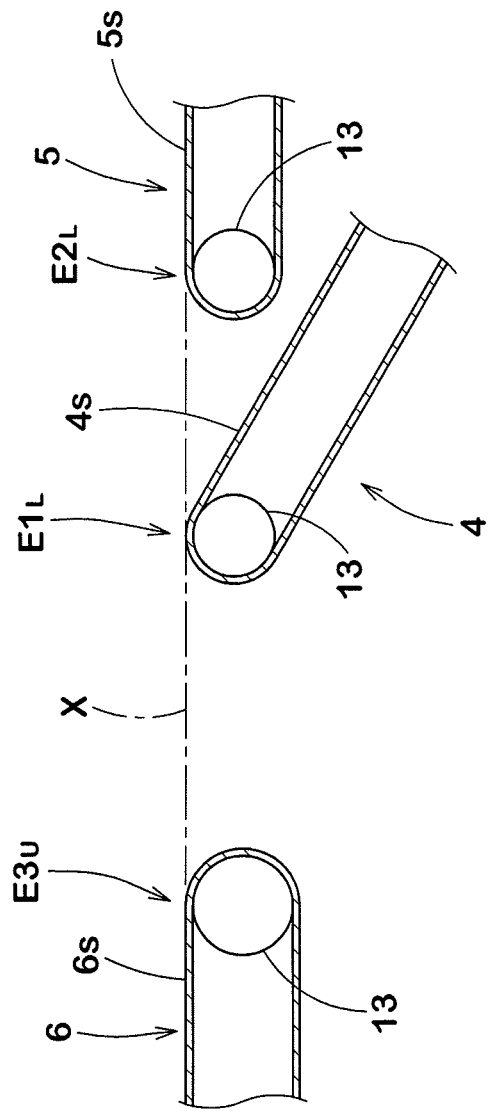
FIG. 10 is a conceptual view of a preferred layout of first to third conveyors.

On the downstream of the first conveyor 4, the third conveyor 6 is arranged to receive the multiple layer rubber strip G. As conceptually illustrated in FIG. 10, a guide roller 13 on the upstream conveyor end $E3_U$ side of the third conveyor 6, a guide roller 13 on the downstream conveyor end $E2_L$ side of the second conveyor 5, and a guide roller 13 on the downstream conveyor end $E1_L$ of the first conveyor 4 are arranged in parallel with each other, and these upper ends are aligned at the same height X. Such a layout of the guide rollers 13 is preferably to transit rubber strips smoothly.

As illustrated in FIG. 2, the pressing device 7 for pressing the first rubber strip G1 and the second rubber strip G2 of the multiple layer rubber strip G with each other is arranged between the first conveyor 4 and the third conveyor 6.

Figure 5:
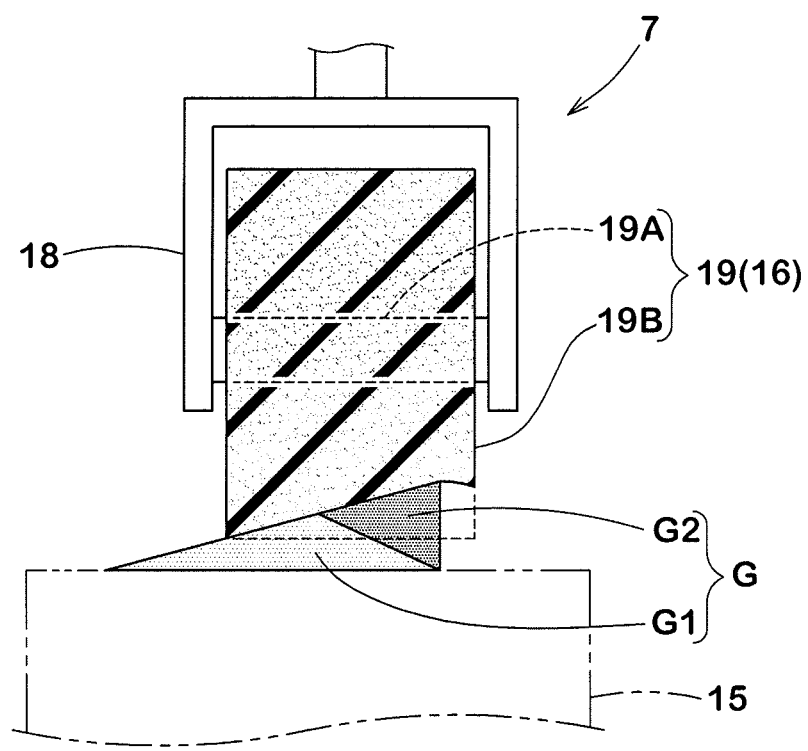
FIG. 5 is a cross-sectional view of a pressing device.

The pressing device 7 includes a support member 15 for supporting an under surface of the multiple layer rubber strip G and a vertically movable pressing member 16 which moves downwardly to press the multiple layer rubber strip G against the support member 15. In this embodiment, as the support member 15, a rotatably supported metallic roller 15A is used. The pressing member 16, for example, includes a vertically movable actuator 17 having a movable rod, e.g., a hydraulic pressure cylinder, and a rotatable pressing roller 19 supported by the rod through a holder 18. The pressing roller 19, as illustrated in FIG. 5, includes a base metal 19A supported by the holder 18 and a flexible portion 19B, e.g., spongy material, arranged around the base metal 19A. By elastically compressed deformation of the flexible portion 19B, the first rubber strip G1 and the second rubber strip G2 of the multiple layer rubber strip G having a substantially triangular cross-sectional shape can be joined uniformly. Note that as the pressing roller 19, various kinds of devices can be used.

Figure 6:
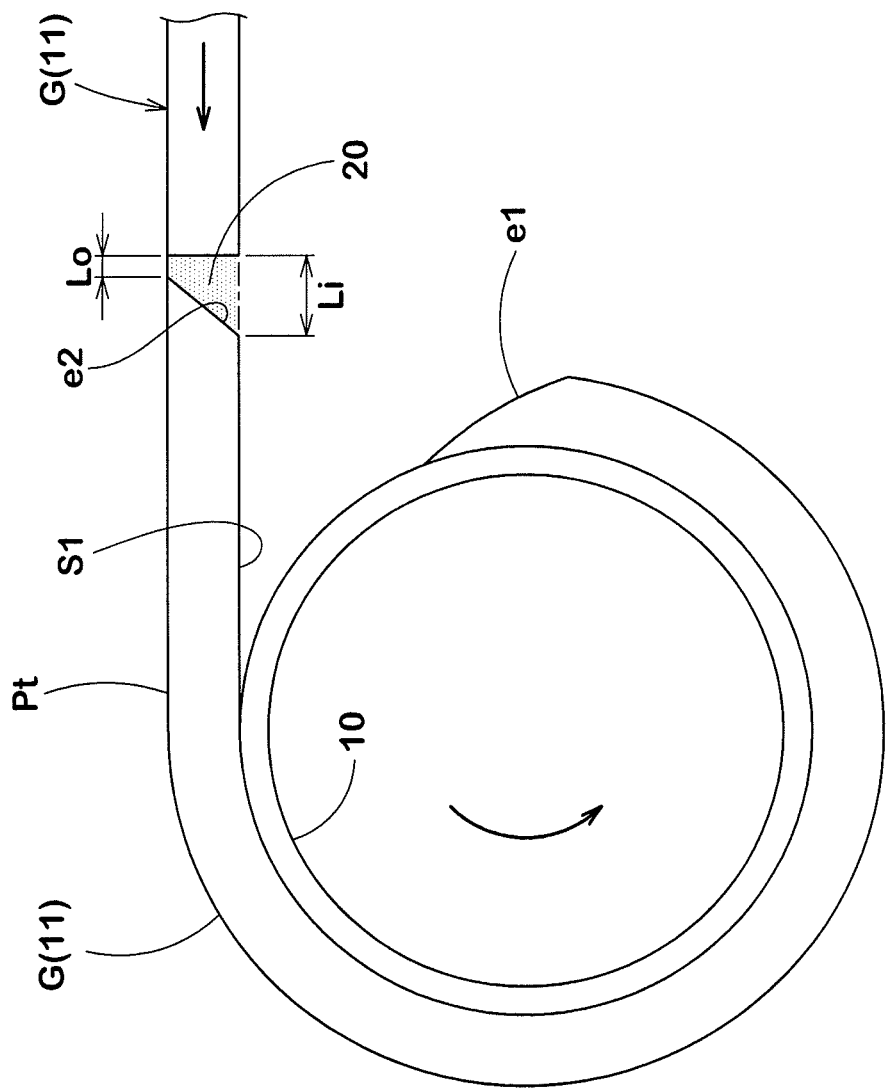
FIG. 6 is a plan view for explaining a winding of a multiple layer rubber strip onto a bead core.
Figure 7A:
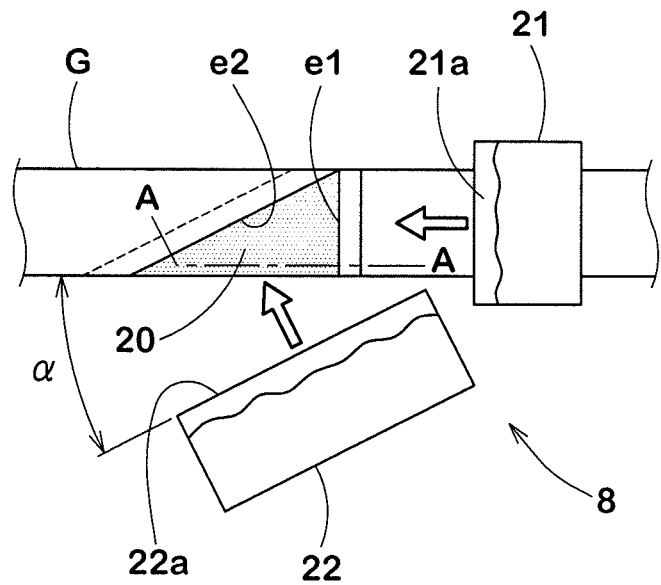
FIGS. 7A and 7B are diagrams for explaining a cutter.

As illustrated in FIG. 6 and FIG. 7A, the cutter 8 cuts the multiple layer rubber strip G to obtain bead apex rubber strips 11 in a predetermined length sequentially such that each of the bead apex rubber strips 11 has a circumferentially extending first side which is longer than a circumferentially extending second side thereof. Thus, in order to joint both ends e1 and e2 of each bead apex rubber strip 11 in a butt-joint manner on the bead core 10, it is preferable that the circumferential length of the tip end Pt side of the strip 11 is longer than the circumferential length of the bottom surface S1 side of the strip 11.

In this embodiment, the cutter 8 may cut the multiple layer rubber strip G sequentially in such a manner as to cut away an independent triangle or trapezoid shaped piece 20 from between adjacent bead apex rubber strips 11, as shown in FIG. 6. The piece 20 includes a circumferential length Li corresponding to the bottom surface S1 side is longer than a circumferential length Lo corresponding to the outer tip end Pt side.

Figure 7B:
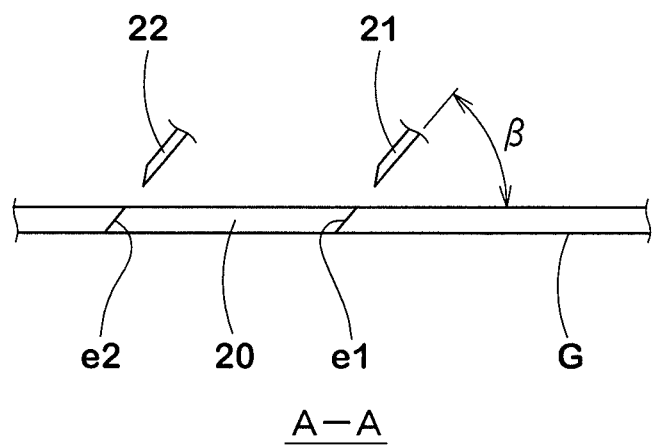

As illustrated in FIG. 7A, in this embodiment, the cutter 8 includes a first cutter 21 having a cutting blade 21a extending perpendicular to the longitudinal direction of the multiple layer rubber strip G, and a second cutter 22 having a cutting blade 22a inclined at an acute angle α with respect to the longitudinal direction. The second cutter 22 can cut the multiple layer rubber strip G at a downstream location with respect to the first cutter 21. The first cutter 21 and the second cutter 22, in this embodiment, are movably supported by an actuator such as a hydraulic pressure cylinder (not illustrated) in directions perpendicular to the respective cutting blades 21a and 22a. As illustrated in FIG. 7B, the first cutter 21 and the second cutter 22 may be inclined at an acute angle β with respect to a thickness direction of the multiple layer rubber strip G. By providing the angle β, both circumferential end surfaces e1 and e2 of the strip G can be joined at a large joining area to improve joining strength. Note that as the cutter 8, various kinds of devices can be used.

As illustrated in FIG. 1, in this embodiment, a first festoon accumulator 25 is provided between the first rubber extruder 2 and the first conveyor 4. Further, a second festoon accumulator 26 is provided between the second rubber extruder 3 and the second conveyor 5.

The first festoon accumulator 25 is designed to store the first rubber strip G1 extruded from the first rubber extruder 2 such that the first rubber strip G1 hangs down in a U-shaped manner. Thus, the first festoon accumulator 25 absorbs the difference between a rubber extruding speed of the first rubber extruder 2 and a conveying speed of the first conveyor 4. Similarly, the second festoon accumulator 26 is designed to store the second rubber strip G2 extruded from the second rubber extruder 3 such that the second rubber strip G2 hangs down in a U-shaped manner. Thus, the second festoon accumulator 26 absorbs the difference between a rubber extruding speed of the second rubber extruder 3 and a conveying speed of the second conveyor 5.

In this embodiment, the device 1 further includes a speed controller 27. The speed controller 27 can vary an extruding speed V1g of the first rubber extruder 2 based on a conveying speed V1c of the first conveyor 4. Further, the speed controller 27 can vary an extruding speed V2g of the second rubber extruder 3 based on a conveying speed V2c of the second conveyor 5.

Typically, when the multiple layer rubber strip G is formed, regarding an extruding speed V1g of the first rubber extruder 2, a conveying speed V1c of the first conveyor 4, an extruding speed V2g of the second rubber extruder 3, a conveying speed V2c of the second conveyor 5, a conveying speed V3c of the third conveyor 6, and a joining speed for arranging the multiple layer rubber strip G onto the bead core 10, these are substantially equal with each other and are a steady speed. Further, cutting the multiple layer rubber strip G is operated at a situation where operations of the first conveyor 4, the second conveyor 5, and the third conveyor 6 are suspended. At this moment, the first rubber extruder 2 and the second rubber extruder 3 are operated such that the respective extruding speeds V1g and V2g are lower than the above steady speed, preferably very low speed which stops almost.

In this embodiment, the speed controller 27, at the time cutting the multiple layer rubber strip G, stops the operations of the first conveyor 4, the second conveyor 5, and the third conveyor 6. Further, the speed controller 27, in response to this action, adjusts the extruding speeds V1g and V2g of the first rubber extruder 2 and the second rubber extruder 3, respectively, to a lower speed than the steady speed. Note that the first rubber strip G1 and the second rubber strip G2 which are extruded in the low extruding speed are stored by the first and second festoon accumulators 25 and 26, respectively.

In the device 1, the first conveyor 4 and the third conveyor 6 may be connected to constitute a single continuous conveyor.

Figure 9:
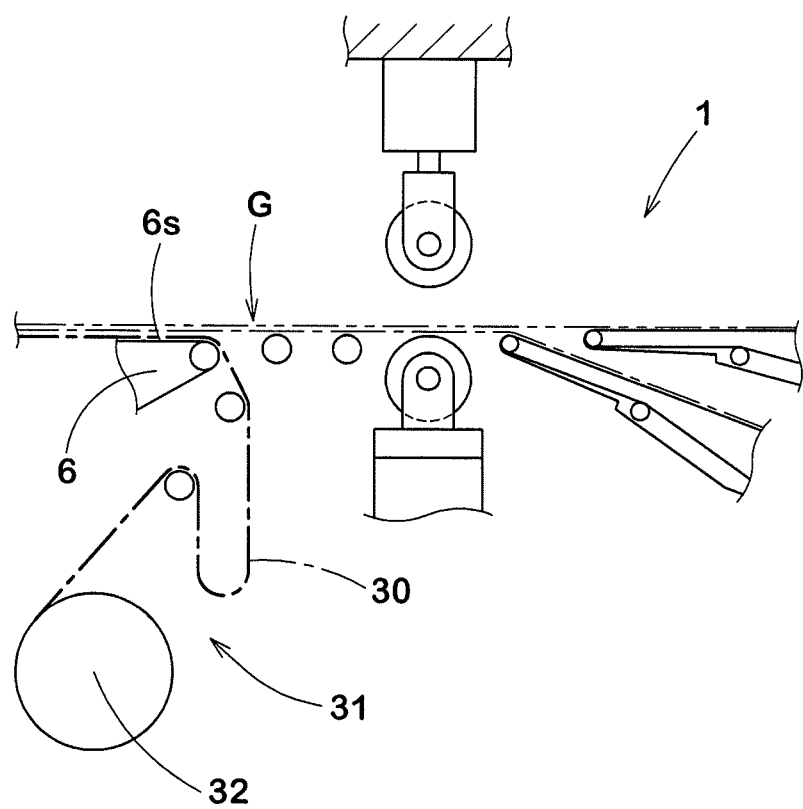
FIG. 9 is a partial conceptual cross-sectional view of the device in accordance with another embodiment.
Figure 11:
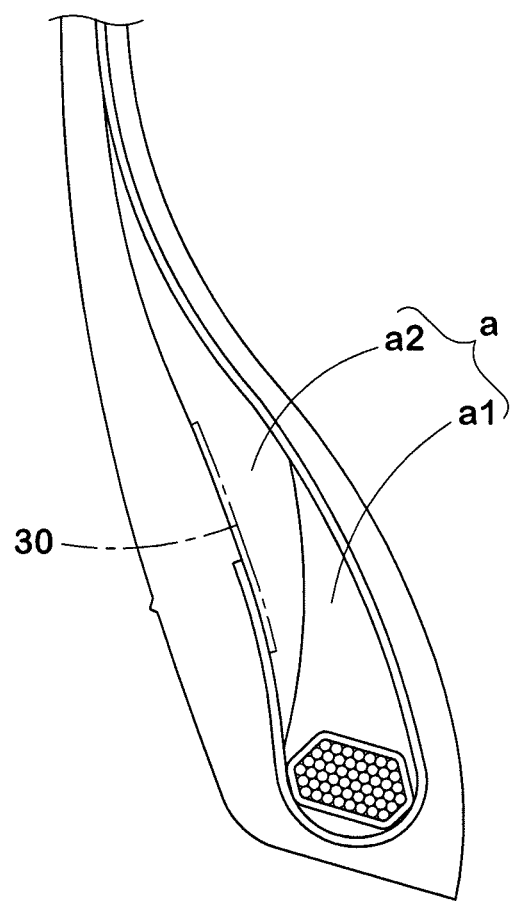
FIG. 11 is a cross-sectional view of the bead apex rubber.

FIG. 9 illustrates another embodiment of the device 1. The device 1 includes a supplier 31 for supplying a sheet member 30 on one of surfaces of the multiple layer rubber strip G (e.g., the under surface). In this embodiment, the supplier 31 includes a reel 32 around which the sheet member 30 is wound. As the sheet member 30, fabric and rubber sheets may be used. The sheet member 30 pulled out of the reel 32 is sent on the conveying surface 6s of the third conveyor 6 through a guide (not illustrated). Then, the multiple layer rubber strip G is carried on the sheet member 30. Thus, a complex member in which the multiple layer rubber strip G and the sheet member 30 located below the strip G are joined together is formed. The sheet member 30 as such, for example, can be used an edge strip for a carcass ply which is one of tire constituting members as illustrated using a one dot-line in FIGS. 8 and 11.

As a method for the multiple layer rubber strip G, using the device 1 as described above to form the multiple layer rubber strip G comprising at least the first rubber strip G1 and the second rubber strip G2 joined together.

While the particularly preferable embodiments in accordance with the present disclosure have been described in detail, the present disclosure is not limited to the illustrated embodiments but can be modified and carried out in various aspects.

What is claimed is:

1. A device for manufacturing a multiple layer rubber strip comprising at least a first rubber strip and a second rubber strip, the device comprising:
   a first rubber extruder for extruding the first rubber strip, the first rubber strip having a first upper surface oriented to form an acute angle with a first lower surface;
   a second rubber extruder for extruding the second rubber strip, the second rubber strip having a second upper surface oriented to form an acute angle with a second lower surface;
   a first conveyor for conveying the first rubber strip extruded from the first extruder to a downstream side in a conveying direction, wherein the first conveyor has a conveying surface on which the first rubber strip is carried; and
   a second conveyor for conveying the second rubber strip extruded from the second extruder to a downstream side in the conveying direction, the second conveyor located upwardly of the first conveyor and having a downstream conveyor end in the conveying direction,
   wherein the downstream conveyor end of the second conveyor is positioned above the conveying surface of the first conveyor such that the second rubber strip is delivered from the downstream conveyor end of the second conveyor to meet and overlap the first rubber strip on the first conveyor at a joining location to form the multiple layer rubber strip,
   wherein the conveying surface extending in the conveying direction of the first conveyor is inclined with respect to a conveying surface extending in the conveying direction of the second conveyor, and
   wherein an angle θ between the conveying surface of the first conveyor and the conveying surface of the second conveyor is from 20 to 30 degrees.

2. The device according to claim 1, further comprising a pressing device to press the first rubber strip and the second rubber strip of the multiple layer rubber strip with each other, wherein the pressing device is located on a downstream side in the convey direction of the joining location.

3. The device according to claim 2, further comprising a third conveyor located on a downstream side of the first conveyor in the conveying direction such that the multiple layer rubber strip on the first conveyor is transferred to the third conveyer, wherein the pressing device is located between the first conveyor and the third conveyor.

4. The device according to claim 1, wherein each of the first and second rubber extruders comprises a gear pump on an extruding end side thereof.

5. The device according to claim 1, further comprising a first festoon accumulator located between the first rubber extruder and the first conveyor, and a second festoon accumulator located between the second rubber extruder and the second conveyor.

6. The device according to claim 1, further comprising a speed controller that varies an extruding speed of the first rubber extruder based on a conveying speed of the first conveyor and that varies an extruding speed of the second rubber extruder based on a conveying speed of the second conveyor.

7. The device according to claim 1, wherein the multiple layer rubber strip is for a bead apex rubber strip which is to be disposed on a radially outer surface of a circular bead core of a tire.

8. The device according to claim 1, wherein the second lower surface of the second rubber strip is delivered from the downstream conveyor end of the second conveyor to meet and overlap the first upper surface of the first rubber strip at the joining location.

9. The device according to claim 1, wherein a width in a cross-section of the first rubber strip is greater than that of the second rubber strip.

10. A device for manufacturing a multiple layer rubber strip comprising at least a first rubber strip and a second rubber strip, the device comprising:
    a first rubber extruder for extruding the first rubber strip, the first rubber strip having a first upper surface oriented to form an acute angle with a first lower surface;
    a second rubber extruder for extruding the second rubber strip, the second rubber strip having a second upper surface oriented to form an acute angle with a second lower surface;
    a first conveyor for conveying the first rubber strip extruded from the first extruder to a downstream side in a conveying direction, wherein the first conveyor has a conveying surface on which the first rubber strip is carried;
    a second conveyor for conveying the second rubber strip extruded from the second extruder to a downstream side in the conveying direction, the second conveyor located upwardly of the first conveyor and having a downstream conveyor end in the conveying direction,
    wherein the downstream conveyor end of the second conveyor is positioned above the conveying surface of the first conveyor such that the second rubber strip is delivered from the downstream conveyor end of the second conveyor to meet and overlap the first rubber strip on the first conveyor at a joining location to form the multiple layer rubber strip, and
    wherein the multiple layer rubber strip is for a bead apex rubber strip which is to be disposed on a radially outer surface of a circular bead core of a tire, and
    a cutter for cutting the multiple layer rubber strip to obtain bead apex rubber strips sequentially such that each of the bead apex rubber strips has a circumferentially extending first side thereof being longer than a circumferentially extending second side thereof, wherein the second side of each of the bead apex rubber strips is to be arranged on the radially outer surface of the bead core.

11. The device according to claim 10, wherein the cutter cuts the multiple layer rubber strip in such a manner as to cut away an independent triangle or trapezoid shaped piece from between adjacent bead apex rubber strips.

12. The device according to claim 10, wherein the conveying surface extending in the conveying direction of the first conveyor is inclined with respect to a conveying surface extending in the conveying direction of the second conveyor.

13. The device according to claim 12, wherein an angle θ between the conveying surface of the first conveyor and the conveying surface of the second conveyor is from 20 to 30 degrees.

14. A method for manufacturing a multiple layer rubber strip in the device according to claim 1, the method comprising:
    forming the first rubber strip with the first upper surface being oriented to form an acute angle with the first lower surface;
    forming the second rubber strip with the second upper surface being oriented to form an acute angle with a second lower surface;
    applying the second rubber strip onto the first rubber strip; and
    forming a multiple layer rubber strip by joining at least the first rubber strip and the second rubber strip together.

15. The method according to claim 14, wherein, in the applying, when the second rubber strip is in contact with the first rubber strip, the second rubber strip is twisted so that an entire second lower surface of second rubber strip comes into contact with the first upper surface of the first rubber strip.

16. A device for manufacturing a multiple layer rubber strip comprising at least a first rubber strip and a second rubber strip, the device comprising:
    a first rubber extruder for extruding the first rubber strip, the first rubber strip having a first upper surface oriented to form an acute angle with a first lower surface;
    a second rubber extruder for extruding the second rubber strip, the second rubber strip having a second upper surface oriented to form an acute angle with a second lower surface;
    a first conveyor for conveying the first rubber strip extruded from the first extruder to a downstream side in a conveying direction, wherein the first conveyor has a conveying surface on which the first rubber strip is carried;
    a second conveyor for conveying the second rubber strip extruded from the second extruder to a downstream side in the conveying direction, the second conveyor located upwardly of the first conveyor and having a downstream conveyor end in the conveying direction,
    wherein the downstream conveyor end of the second conveyor is positioned above the conveying surface of the first conveyor such that the second rubber strip is delivered from the downstream conveyor end of the second conveyor to meet and overlap the first rubber strip on the first conveyor at a joining location to form the multiple layer rubber strip,
    a pressing device to press the first rubber strip and the second rubber strip of the multiple layer rubber strip with each other, wherein the pressing device is located on a downstream side in the convey direction of the joining location; and
    a third conveyor located on a downstream side of the first conveyor in the conveying direction such that the multiple layer rubber strip on the first conveyor is transferred to the third conveyer, wherein the pressing device is located between the first conveyor and the third conveyor,
    wherein the first conveyor comprises a first guide roller located on a downstream conveyor end thereof, the second conveyor comprises a second guide roller located on the downstream conveyor end thereof, the third conveyor comprises a third guide roller located on an upstream conveyor end thereof, and the first guide roller, the second guide roller and the third guide roller are arranged in parallel with each other such that upper ends of the first, second and third guide rollers are aligned at a same height.

* * * * *